UNITED STATES PATENT OFFICE.

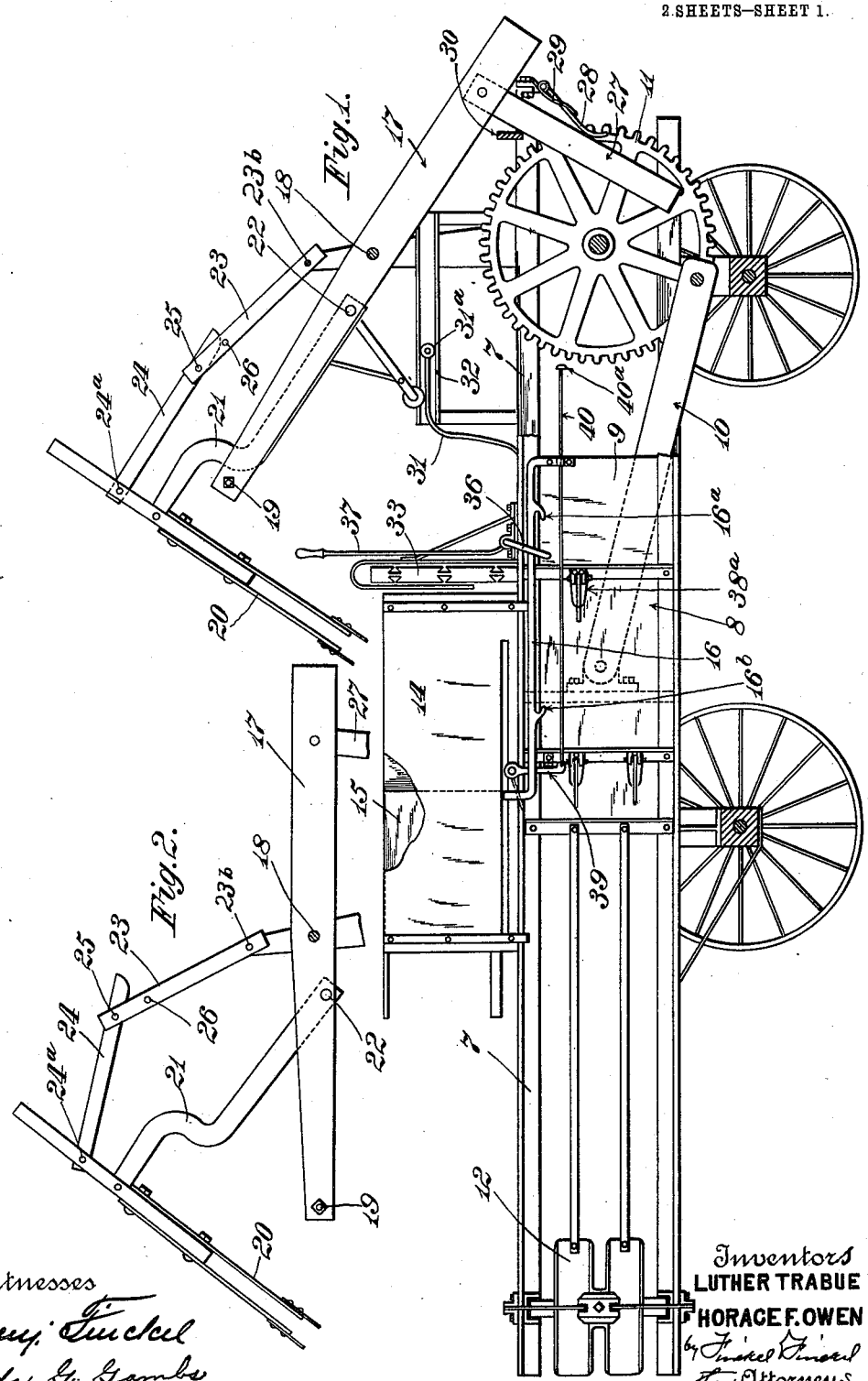

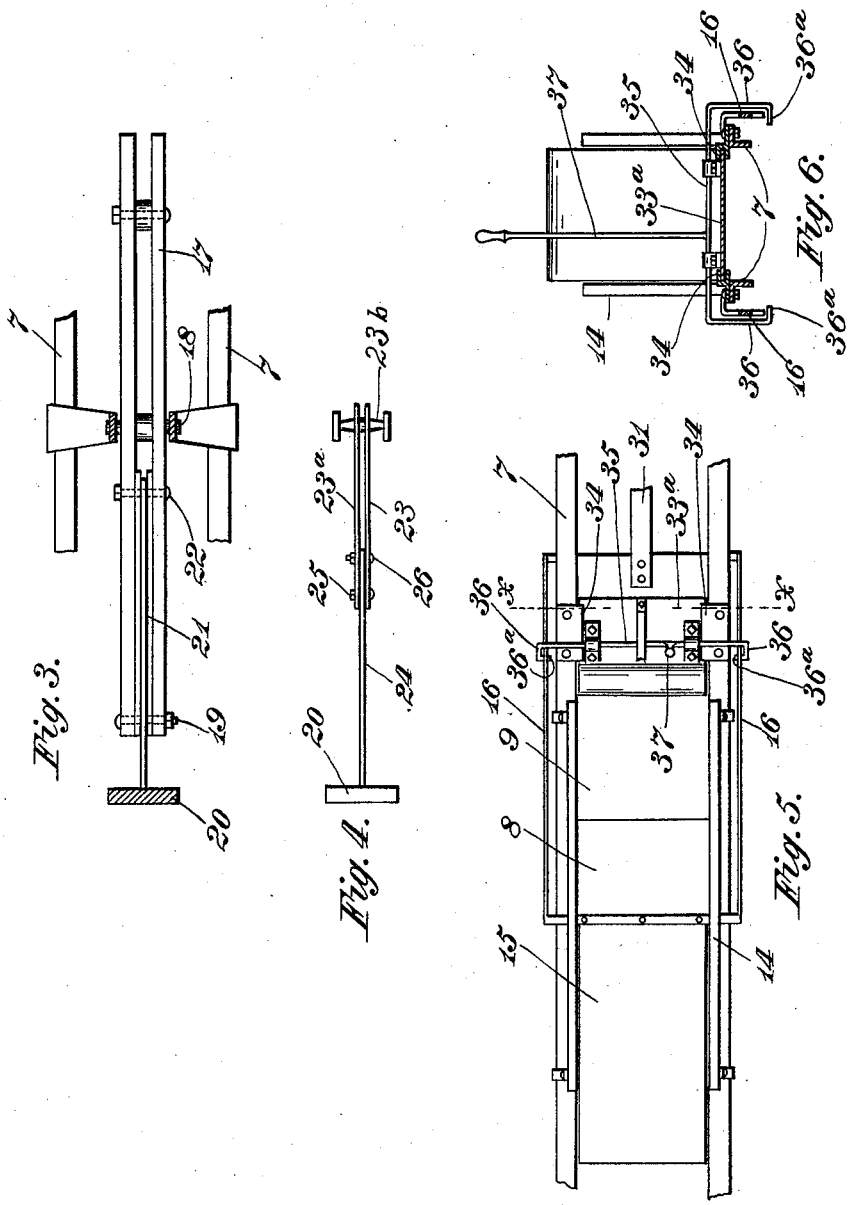

LUTHER TRABUE AND HORACE F. OWEN, OF DELAWARE, OHIO.

HAY-PRESS.

1,013,464.

Specification of Letters Patent. Patented Jan. 2, 1912.

Application filed July 23, 1908. Serial No. 444,931.

*To all whom it may concern:*

Be it known that we, LUTHER TRABUE and HORACE F. OWEN, citizens of the United States, residing at Delaware, in the county of Delaware and State of Ohio, have invented a certain new and useful Improvement in Hay-Presses, of which the following is a specification.

The object of this invention is to make improvements in the details of construction of hay presses, whereby the parts are not so likely to be injured by faulty operation, and whereby the division board is automatically dropped into position at the proper moment.

The invention consists in the construction hereinafter particularly described and claimed.

In the accompanying drawings—Figure 1 is a side view of a hay press containing our improvements, with parts in section and parts omitted. Fig. 2 is a detail of the feeder lever and blade, showing how the latter is movable with reference to the former when subjected to undue strain. Fig. 3 is a top plan view of the parts referred to in the description of Fig. 2. Fig. 4 is a top plan view of the breakable paralleler used in connection with the feeder blade. Fig. 5 is a detail in top plan view of the condensing devices and the division block holder and releasing devices. Fig. 6 is a cross section on the line $x$—$x$, Fig. 5.

As many of the parts are of a construction familiar to those skilled in the art, they will be referred to but briefly.

The character 7 designates generally the usual truck or bed upon which the parts are mounted.
8 designates the baling chamber in which is located the plunger 9, reciprocated by a pitman 10, the latter being connected with a power driven spur wheel 11.

The character 12 designates the bale tension.

14 designates the charging hopper in which reciprocates the condenser 15. The condenser 15 and plunger 9 are connected to work together by bars 16, each having hooks $16^a$ and $16^b$ to operate the division block holder as hereinafter described.

17 designates the feeder lever which is fulcrumed at 18 to fixed standards rising from the frame. This lever is composed of two bars adapted to be sprung together at their upper ends by a nutted bolt 19.

The feeder blade 20 is of ordinary construction, but it is pivoted to a goose-neck shank 21, and the latter is pivoted at 22, between the bars of the feeder lever. By properly tightening the bolt and nut at 19 on the goose-neck shank 21 the feeder blade can be held by friction in proper position to feed the material from the condenser to the baler, but should the feeder strike a hard lump it will yield and be put into or about the relative position seen in Fig. 2. To direct the feeder blade in a more nearly vertical direction on the charge, we provide a paralleler comprising a flexible or breakable arm composed of a pair of limbs 23 and $23^a$ pivoted at $23^b$ on the fixed standards and a limb 24 pivoted at $24^a$ on the feeder blade, the pair of limbs 23 and $23^a$ and single limb 24 being hinged together by a bolt and nut at 25. A bolt and nut stop 26 is provided to hold the said limbs out of line with each other so that they can break upward only. Either of the bolts and nuts 25 and 26 can be adjusted to create friction.

The lower end of the feeder lever 17 has hinged to it a loose dog arm 27 that is guided between a finger 28 held by a spring 29 on the rear end of the main frame and a fixed guide 30. The dog 27 is struck by the rear end of the plunger pitman as the latter revolves, so as to throw down the feeder blade. The reason for this construction of dog is that if the pitman happens, through ignorance or inattention, to be operated in the reverse or wrong direction, no damage will be done. The dog arm 27, in that event, will be oscillated against the spring 29. The feeder blade is quickly raised out of the charging hopper by the action of the reciprocated cam strip 31 attached at its lower end to the plunger, and guided at its upper end by rollers $31^a$ running in stationary runways 32.

33 designates the division block which is of the usual construction. The holder for the division block consists of an inverted J-shaped member mounted on a base $33^a$ that slides in ways 34. Mounted on the base or slide $33^a$ is a rock shaft 35, having cranks 36 at its ends with inturned ends $36^a$. Secured to the rock shaft 35 is a hand lever 37 which, when standing vertically places the inturned ends $36^a$ beyond the path of the hooks $16^a$; but when thrown down puts said inturned ends $36^a$ into the path of said hooks. The hooks $16^b$ operate to throw the lever 37 into vertical or normal position. A division block to be dropped into the baler is put in the holder as shown in Fig. 1. The division block rests on the plunger which reciprocates under it. After a quantity sufficient to make a bale has been supplied to the baler, the hand lever 37 is pulled down. On the next forward stroke of the plunger the block holder is carried to a position where, upon the return stroke of the plunger, the latter will be drawn from under the block and the block will drop into the baler chamber. The division block is held upright in the dropped position as usual by springs 38. In the baler are also, as usual, springs 38ª, for holding a block when the first bale is made. After the first bale is made, the bale or bales in the tension frame furnish the resistance for the manufacture of further bales as usual.

39 designates the outer crank arm of the tucker. The tucker, as is well known, is simply a rocking blade to tuck in stray ends of the charge. In the instance shown, the tucker is provided with a rod 40, having at its rear end a button 40ª that is struck by the secured end of the bar 16 when that bar is carried rearward on the return stroke of the plunger. When the button 40ª is thus struck the tucker is depressed and thus pushes into the bale the loose ends of straw or hay sticking out at the edge of the charge.

What we claim and desire to secure by Letters Patent is:

1. In a baling press, the combination of a division block holder, means for slidingly supporting the same, means operating with the plunger to carry said holder into position to drop the block into the baling chamber.

2. In a baling press, the combination of a division-block holder, means for slidingly supporting the same, means operating with the plunger to carry said holder into position to drop the block into the baling chamber, and means to restore the holder to normal position.

LUTHER TRABUE.
HORACE F. OWEN.

Witnesses:
H. E. KENDRICK,
ADOLPHUS WELLS.

Copies of this patent may be obtained for five cents each, by addressing the "Commissioner of Patents, Washington, D. C."